United States Patent [19]

Witman et al.

[11] Patent Number: 4,828,921

[45] Date of Patent: May 9, 1989

[54] POLYCARBONATE MOLDING COMPOSITIONS

[75] Inventors: Mark W. Witman; Sivaram Krishnan, both of Pittsburgh, Pa.; Wolfgang Siebourg, Bad Godesberg, Fed. Rep. of Germany; Ronald L. Price, Moundsville, W. Va.

[73] Assignee: Mobay Corporation, Pittsburgh, Pa.

[21] Appl. No.: 121,435

[22] Filed: Nov. 17, 1987

Related U.S. Application Data

[63] Continuation of Ser. No. 920,480, Oct. 17, 1986, abandoned.

[51] Int. Cl.$^4$ .............................................. B32B 27/36
[52] U.S. Cl. ..................................... 428/412; 525/67; 428/461; 428/463; 428/921
[58] Field of Search ...................... 428/412, 921, 463; 525/67, 148, 902

[56] References Cited

U.S. PATENT DOCUMENTS

| | | | |
|---|---|---|---|
| 4,125,649 | 11/1978 | Donovan et al. | 427/307 |
| 4,299,928 | 11/1981 | Witman | 525/67 |
| 4,378,449 | 3/1983 | Witman | 525/67 |
| 4,390,657 | 6/1983 | Liu | 524/504 |
| 4,396,679 | 8/1983 | Gaku et al. | 428/412 |
| 4,427,829 | 1/1984 | Ohara et al. | 525/67 |
| 4,554,315 | 11/1985 | Chung et al. | 525/67 |
| 4,563,503 | 1/1986 | Witman et al. | 525/148 |

FOREIGN PATENT DOCUMENTS

| | | |
|---|---|---|
| 0122601 | 10/1984 | European Pat. Off. . |
| 0132339 | 1/1985 | European Pat. Off. . |
| 0154097 | 9/1985 | European Pat. Off. . |
| 0186917 | 7/1986 | European Pat. Off. . |
| 1394481 | 5/1975 | United Kingdom . |

*Primary Examiner*—Theodore E. Pertilla
*Attorney, Agent, or Firm*—Gene Harsh; Joseph C. Gil; Aron Preis

[57] ABSTRACT

A moulding composition comprising a polycarbonate resin and an acrylate-based plating modifier was found to be suitable for preparing metal coated articles where the metal coating is deposited by an electroless process. In a preferred embodiment of the invention the moulding composition further comprise a flame retarding agent.

2 Claims, No Drawings

POLYCARBONATE MOLDING COMPOSITIONS

This application is a continuation of application Ser. No. 920,480 filed Oct. 17, 1986, now abandoned.

FIELD OF THE INVENTION

The invention is directed to polycarbonate molding compositions and more particularly to compositions suitable for the preparation of molded articles having a metal coating electrolessly deposited thereon.

SUMMARY OF THE INVENTION

A molding composition comprising a polycarbonate resin and an acrylate-based plating modifier was found to be suitable for preparing metal coated articles where the metal coating is deposited by an electroless process. In a preferred embodiment of the invention the molding composition further comprise a flame-retarding agent.

BACKGROUND OF THE INVENTION

Electroless plating of articles molded from polycarbonate resins are used in the manufacture of EMI shielded articles. Processes for electroless plating have been disclosed in U.S. Pat. No. 4,125,649 and in the Encyclopedia of Polymer Science and Technology, Vol. 8 among others.

Polycarbonate molding compositions containing acrylate rubber have been reported in U.S. Pat. Nos. 4,299,928 and 4,378,449 In these patents, the addition of 1 to 20 percent of acrylate rubber percent is said to result in improved impact performance.

Flame retarding agents for polycarbonates are known. Such agents have been disclosed in the patent literature and in the manuscript The Chemistry & Uses of Fire Retardants, John W. Lyons, Wiley Interscience, 1970.

DETAILED DESCRIPTION OF THE INVENTION

The Polycarbonate Resin

The polycarbonate resins useful in the practice of the invention are homopolycarbonates, copolycarbonates and terpolycarbonates or mixtures thereof. The polycarbonates generally have a molecular weight of 10,000–200,000 (weight average molecular weight), preferably 20,000–80,000 and their melt flow rate, per ASTM D-1238 at 300° C., is about 1 to about 24 gm/10 min., preferably about 2–15 gm/10 min. They may be prepared, for example, by the known diphasic interface process from a carbonic acid derivative such as phosgene and dihydroxy compounds by polycondensation (see German Offenlegungsschriften Nos. 2,063,050; 2,063,052; 1,570,703; 2,211,956; 2,211,957 and 2,248,817; French Pat. No. 1,561,518; and the monograph H. Schnell, "Chemistry and Physics of Polycarbonates", Interscience Publishers, New York, 1964, all incorporated herein by reference).

In the present context, dihydroxy compounds suitable for the preparation of the polycarbonates of the invention conform to the structural formulae (1) or (2)

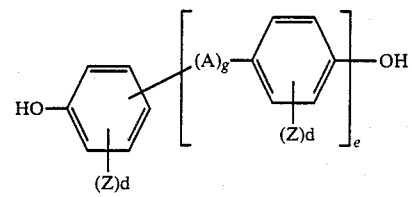

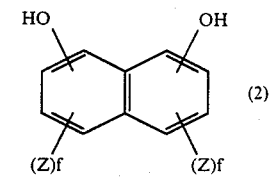

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO$_2$— or a radical conforming to

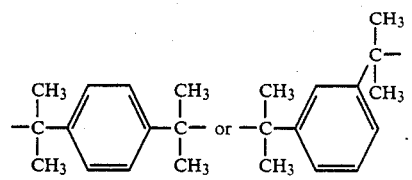

e and g both denote the number 0 to 1;

Z denotes F, Cl, Be or C$_1$–C$_4$-alkyl and if several Z radicals are substituents in one aryl radical, they may be identical or different;

d denotes 0 or an integer of from 1 to 4; and f denotes 0 or an integer of from 1 to 3.

Among the useful bisphenols in the practice of the invention are hydroquinone, resorcinol, bis-(hydroxyphenyl)-alkanes, bis-(hydroxyphenyl)-ethers, bis-(hydroxyphenyl)-ketones, bis-(hydroxyphenyl)-sulfoxides, bis-(hydroxyphenyl)-sulfides, bis-(hydroxyphenyl)-sulfones and α,α',-bis-(hydroxyphenyl)-diisopropyl-benzenes, as well as their nuclear-alkylated compounds. These and further suitable aromatic dihydroxy compounds are described, for example, in U.S. Pat. Nos. 3,028,356; 2,999,835; 3,148,172; 2,991,273; 3,271,367; and 2,999,846, all incorporated herein by reference. Further examples of suitable bisphenols are 2,2-bis-(4-hydroxyphenyl)-propane (bisphenol A), 2,4-bis-(4-hydroxyphenyl)-2-methyl-butane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, hydroxybenzophenone, 2,4-bis-(3,5-dimethyl-4-hydroxyphenyl)-cyclohexane, α,α'-bis-(3,5-dimethyl-4-hydroxyphenyl)-p-diisopropylbenzene and 4,4'-sulfonyl diphenyl.

Examples of particularly preferred aromatic bisphenols are 2,2-bis-(4-hydroxyphenyl)-propane, 2,2-bis- (3,5-dimethyl-4-hydroxyphenyl)-propane and 1,1-bis-(4-hydroxyphenyl)-cyclohexane.

The mose preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention are included phenolphthalein-based polycarbonate, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05–2.0 mol % (relative to the bisphenols) of polyhydroxyl compounds. Polycarbonates of this type have been described, for example, in German Offenlegungsschriften Nos. 1,570,533; 2,116,974 and 2,113,374; British Pat. Nos. 885,442 and 1,079,821 and U.S. Pat. No. 3,544,514. The following are some examples of polyhydroxyl compounds which may be used for this purpose: phloroglucinol; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)-cyclohexyl]-propane; 2,4-bis-(4-hydroxy-1-isopropylidine)-phenol; 2,6-bis-(2'-dihydroxy-5'-methylbenzyl)-4-methylphenol; 2,4-dihydroxy-benzoic acid; 2-(4-hydroxyphenyl)-2-(2,4-dihydroxyphenyl)-propane and 1,4-bis-(4,4'-dihydroxytriphenylmethyl)-benzene. Some of the other polyfunctional compounds are 2,4-dihydroxybenzoic acid, trimesic acid, cyanuric chloride and 3,3-bis-(4-hydroxyphenyl)-2-oxo-2,3-dihydroindole.

In addition to the polycondensation process mentioned above, oher processes for the preparation of the polycarbonates of the invention are polycondensation in a homogeneous phase and transesterification. The suitable processes are disclosed in the incorporated herein by references U.S. Pat. Nos. 3,028,365; 2,999,846; 3,153,008; and 2,991,273.

The preferred process for the preparation of polycarbonates is the interfacial polycondensation process.

Other methods of synthesis in forming the polycarbonates of the invention such as disclosed in U.S. Pat. No. 3,912,688, incorporated by reference herein, may be used.

Suitable polycarbonate resins are available in commerce, for instance, under the tradenames Merlon FCR, Merlon M-39, Merlon M-40 and Merlon M-50, all of which are bisphenol A based homopolycarbonate resins differing in terms of their respective molecular weights and characterized in that their melt indices per ASTM D-1238 are about 16.5–24, 13–16, 7.5–13.0 and 3.5–6.5 gm/10 min., respectively. These are products of Mobay Corporation of Pittsburgh, Pa.

Flame retardant agents for polycarbonate resins are known in the art. These agents have been widely reported in the patent literature and include halogenated compounds, especially brominated compounds and most particularly aromatic brominated compounds, sulfonate salts of alkali metals or alkaline earth metals and complex ion metal salts, such as sodium aluminum fluoride, and phosphorus compounds. The relevant literature includes U.S. Pat. No. 3,146,254, which discloses tri-bisphenol A ester of phosphoric acid, U.S. Pat. No. 3,823,175 relating to halogenated neopentyl chloroformates, U.S. Pat. No. 4,195,156 entailing disulfonic acid salts and U.S. Pat. No. 4,269,762 relating to tetrahydrocarbylborate salts. Also relevant are U.S. Pat. Nos. 3,027,349 (phosphate polymers), 3,475,372 (metal salts of mercaptobenzotriazoles), 3,509,090 (halogenated organosilicones), 3,535,300 (organo metal salts), 3,557,053 (tris-halophenyl phosphates), 3,597,390 (tris-halophenyl phosphites), 3,775,367 (perfluorosulfonate salts), 3,836,490 (alkali metal salts), 3,875,107 (alkali metal salts), 4,017,457 (ferrocene), 4,098,754 (alkali metal organic salts), 4,100,130 (sulfur), 4,174,359 (oligomeric tetrabromo polycarbonate and sulfonate salts), 4,223,100 (alkali metal salts, PTFE and an aromatically bound bromine) as well as U.S. Pat. Nos. 3,382,207 (decabromodiphenyl carbonate), 3,647,747 (barium carbonate), 3,651,174 ($BaCO_3$, organosiloxane and PTFE), 3,796,772 (titanates), 3,867,336 (an aryloxy substituted polyhalogenated aromatic compound); U.S. Pat. Nos. 3,931,100, 3,940,366, 3,951,910, 3,953,396, 3,978,024, 4,001,175, 4,007,155, 4,032,506, 4,033,930, 4,039,509, 4,064,101, 4,067,846, 4,073,768, 4,075,164, 4,093,590, 4,093,589, 4,104,245, 4,104,246, 4,115,354, 4,153,595, 4,201,832, 4,263,201, 4,268,429, 3,909,490, 3,917,559, 3,919,167 (sulfonic acid salts), 3,933,734 (sulfonates), 3,948,851, 4,092,291 (sulfone-sulfonic salts), 3,953,399 (carboxylic acid esters), 3,971,756 (alkali metal salts and siloxanes), 4,028,297 (salts of inorganic sulfur oxyacids), 4,066,618 (metal salts of halogenated nonaromatic carboxylic acid), 4,069,201, 4,111,977 (unsubstituted or halogenated oxycarbon acids), 4,104,253, 4,113,695 (halogenated organic metal salts), 4,209,427 (formaldehydes), 4,220,583 (partially fluorinated olefins), 4,235,978 (organopolysiloxanes), 4,241,434 (alkali or alkalines earth metal salts), 4,254,252 (cyclic polyformates), the disclosures of each of the above patents is incorporated herein by reference. Preferably the flame retarding agents are sulfonate salts and halogenated aromatic compounds.

The plating modifier suitable in the composition of the invention is an acrylic rubber graft copolymer. Such graft copolymers have been described as interpolymeric composites in U.S. Pat. Nos. 4,096,202 and 3,808,180 and as graft copolymers in U.S. Pat. No. 4,022,748 all incorporated by reference herein.

Acrylic rubber interpolymer composites are compositions comprising about 25 to 95 percent by weight of a first elastomeric phase and about 75 to 5 percent by weight of a second, rigid, thermoplastic phase. The first phase is polymerized from about 75 to 99.8 percent by weight $C_1$ to $C_6$ acrylate resulting in an acrylic rubber core having a glass transition temperature below about 10° C. which is cross-linked with 0.1 to 5 percent by weight of a cross-linking monomer and to which is added 0.1 to 5 percent by weight of a graft-linking monomer.

The preferred alkyl acrylate is butyl acrylate. The cross-linking monomer is a polyethylenically unsaturated monomer having a plurality of addition polymerizable reactive groups all of which polymerize at substantially the same rate of reaction. Suitable cross-linking monomers include polyacrylic and polymethacrylic esters of polyols such as butylene diacrylate and dimethyacrylate, trimethylol propane trimethylacrylate and the like, di- and trivinyl benzene, vinyl acrylate and methacrylate, and the like. The preferred cross-linking monomer is butylene diacrylate. The graft-linking monomer is a polyethylenically unsaturated monomer having a plurality of addition polymerizable reactive groups, at least one of which polymerizing at a substantially different rate of polymerization from at least one other of said reactive groups. The function of the graft-linking monomer is to provide a residual level of unsaturation in the elastomeric phase, particularly in the later stages of polymerization and consequently at or near the surface of the elastomer particles. The preferred graft-linking monomers are alkyl methacrylate and dialkylmaleate.

The final stage monomer system can be comprised of $C_1$ to $C_{16}$ methacrylate, styrene, acrylonitrile, alkyl acrylates, alkyl methacrylate, dialkyl methacrylate, and the like. Preferably, the final stage monomer system is at least 50 weight percent $C_1$ to $C_4$ alkyl methacrylate.

A certain acrylic rubber interpolymer composite characterized in that acrylic rubber core is comprised of n-butyl acrylate and in that its cross-linking agent is 1,3-butylene diacrylate and in which the graft-linking agent is diallyl maleate and the second phase monomeric system of which is methylmethacrylate is available under the tradename Acryloid KM 330 from Rohm & Haas. Additional suitable acrylate based plating modifiers are available from Rohm & Haas under the trade names Acryloid KM 2330, 3330 and 2301 (also known as ES 8301SXP).

Other suitable graft copolymers have rubber elastic properties and a glass transition temperature below $-20°$ C. Their preparation entails a prepolymer made from at least 10% of a $C_1$-$C_{15}$ acrylate and from 0.1% to about 10% of a graft linking monomer having 2 olefinic double bonds which are not conjugated. The prepolymer is grafted with 10-85 parts by weight, preferably 20 to 75 parts by weight of styrene and/or methacrylates and/or methacrylic or acrylic acid. The parts by weight are in relation to 100 parts of prepolymer.

In the practice of the invention, a thermoplastic molding composition is prepared by blending a polycarbonate resin with up to about 1 percent, preferably 0.30 to about 0.95 percent, most preferably 0.40 to about 0.85 percent of a plating modifier, said percents being relative to the total weight of the resin and modifier.

In an additional embodiment of the invention the composition comprises a polycarbonate resin and a plating modifier in an amount of 0.3 to 25 percent, preferably 0.3 to 20 percent most preferably 0.3 to 10% in relation to the weight of the resin, and a flame retarding agent in an amount sufficient to render the composition a flammability rating of V-0, ⅛" in accordance with UL-94.

The compositions of the invention may further contain auxiliary additives such as pigments, stabilizers, release agents, fillers and reinforcing agents all of which are conventional and are known in the art.

The invention is illustrated below but is not intended to be limited by the examples in which all parts and percentages are by weight unless otherwise specified.

EXAMPLES

EXAMPLE 1

Compositions within the scope of the invention were prepared and test specimens molded therefrom. The preparation and molding steps followed conventional procedures and used known equipment. In the examples, the resin was Merlon M-39 polycarbonate and Acryloid KM 330 interpolymer composite was used as the plating modifier in the indicated compositions. A flame retarding agent, potassium perfluorobutane sulfonate, was included in compositions 1-1 and 1-2. Pigments, and in compositions 1-1 and 1-2 also a mold release agent, neither having criticality in the present context were also included.

The molded specimens were coated with a thin layer of copper deposited by an electroless process. The table below summarizes the results of the evaluation of the compositions.

| Compositions | 1-1 | 1-2 | 1-3 |
| --- | --- | --- | --- |
| Polycarbonate, % | 98.4 | 97.6 | 95.2 |
| Flame retarding agent, % | 0.1 | 0.1 | — |
| Plating modifier | — | 0.75 | 4.5 |
| Melt index, gm/10 min. | 16.5 | 15.1 | 10-11 |
| Impact strength, Notched Izod, ft. lb/in | | | |
| ⅛" | 15.2 | 15.1 | 15.5 |
| ¼" | 1.9 | 1.9 | 12.5 |
| Critical thickness, mils | 145 | 145 | 400 |
| Flammability rating, UL-94, ⅛" | V-0 | V-0 | HB |
| after 7 days aging[1] | V-0 | V-0 | |
| Platability[2] | | | |
| Pre etch | | | |
| 2.125 min. | 4/B | 5/5 | 5/5 |
| 3.0 min. | 2/B | 5/5 | 5/5 |

[1]aging conditions per UL-94 V-0
[2]determined as cross-hatch adhesion per ASTM D-3359-78. The numbers indicate a rating on a scale of 1-5 (corresponding to worst-best); B denotes blisters. The values are given as determined on "as is" specimens and on aged specimens (as-is/aged).

EXAMPLE 2

Further compositions in accordance with the invention were prepared and their properties determined as shown below. In this series the resin was Merlon FCR polycarbonate which is a homopolycarbonate based on bisphenol A having a melt flow index of about 22.5 gm/10 min. The compositions also contained the indicated amount of a plating modifier (Acryloid KM 330 interpolymeric composite) and about 0.1% of a flame retarding agent (potassium perfluorobutane sulfonate). Molded specimens were prepared using conventional means and procedures and the specimens coated with a thin layer of copper by an electroless process. The peel strength, indicating the degree of adhesion of the coating to the molded part was determined as shown below.

| Composition | Plating modifier, % | Peel strength, psi |
| --- | --- | --- |
| 2-1 | 0.0 | 2.8 |
| 2-2 | 0.68 | 4.8 |
| 2-3 | 0.75 | 5.0 |
| 2-4 | 0.83 | 5.0 |

A similar evaluation based on compositions where the polycarbonate resin had a melt flow index of 14.0 gm/10 min. yielded the following results.

| Composition | Plating, modifier, % | Peel strength, psi |
| --- | --- | --- |
| 2-5 | 0.0 | 5.3 |
| 2-6 | 0.3 | 3.2 |
| 2-7 | 0.45 | 7.2 |
| 2-8 | 0.60 | 7.8 |

EXAMPLE 3

In yet another series of experiments plaques were molded from polycarbonate compositions containing 0.75% of Acryloid KM 330 interpolymer composite and 0.1% of potassium perfluorobutane sulfonate. The specimens were coated with a thin layer of copper by an electroless process. The coated plates were then dried and oven-aged at 85° C. and the formation of blisters resulting during the aging process was monitored. A comparison between the performance of these compositions and control compositions which contained no plating modifier is presented below:

| Composition | Plating | Appearance[2] As is | After thermal aging after 12 days | after 20 days |
|---|---|---|---|---|
| 3-1 | 0.0 | NB | NB | B |
| 3-2 | 0.0 | NB | NB | B |
| 3-3 | 0.75 | NB | NB | NB |
| 3-4 | 0.75 | NB | NB | NB |

[1]Compositions 3-1 and 3-3 are based on Merlon M-39 and compositions 3-2 and 3-4 are based on Merlon-FCR
[2]NB—no blisters; B—blisters Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An article molded from an aromatic polycarbonate composition comprising 0.3 to 0.95 percent of an acrylate rubber plating modifier and a flame-retarding agent characterized in that its flammability rating is at least V-0 for $\frac{1}{8}''$ specimens in accordance with UL-94 and in that it is at least partially coated with a metal layer deposited by an electroless process.

2. The article of claim 1 wherein said modifier is present in an amount of about 0.40 to about 0.85 percent.

* * * * *